United States Patent
Zhang et al.

(10) Patent No.: US 9,924,473 B2
(45) Date of Patent: Mar. 20, 2018

(54) COMPENSATION METHOD, BASE STATION, AND USER EQUIPMENT FOR UPLINK POWER CONTROL IN A COMP SYSTEM

(71) Applicant: Huawei Technologies Co., Ltd., Shenzhen, Guangdong (CN)

(72) Inventors: Jiayin Zhang, Shenzhen (CN); Wei Ni, Shenzhen (CN); Xiaotao Ren, Shenzhen (CN); Jun Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 14/180,556

(22) Filed: Feb. 14, 2014

(65) Prior Publication Data

US 2014/0161078 A1 Jun. 12, 2014

Related U.S. Application Data

(63) Continuation of application No. PCT/CN2012/080242, filed on Aug. 16, 2012.

(30) Foreign Application Priority Data

Aug. 16, 2011 (CN) .......................... 2011 1 0234795

(51) Int. Cl.
*H04L 12/26* (2006.01)
*H04W 52/24* (2009.01)
(Continued)

(52) U.S. Cl.
CPC ....... *H04W 52/242* (2013.01); *H04W 52/146* (2013.01); *H04W 52/247* (2013.01);
(Continued)

(58) Field of Classification Search
CPC ..... H04W 72/04; H04W 88/08; H04W 76/00; H04W 84/08; H04W 76/02; H04W 52/46;
(Continued)

(56) References Cited

U.S. PATENT DOCUMENTS

2006/0093026 A1* 5/2006 Montojo ............. H04W 52/267
375/225
2008/0200203 A1* 8/2008 Malladi ............... H04W 52/287
455/522

(Continued)

FOREIGN PATENT DOCUMENTS

CN 101527958 A 9/2009
CN 101662824 A 3/2010
(Continued)

OTHER PUBLICATIONS

"UL SRS enhancements to support CoMP and Transmit Diversity," 3GP TSG-RAN WG1 #59bis, Valencia, Spain, Document R1-100434, 3rd Generation Partnership Project, Valbonne, France (Jan. 18-22, 2010).

(Continued)

*Primary Examiner* — Brenda H Pham
(74) *Attorney, Agent, or Firm* — Leydig, Voit & Mayer, Ltd.

(57) ABSTRACT

A compensation method, a base station, and a user equipment for uplink power control in a CoMP system are provided. The method includes: a base station determines an adjustment value for an uplink sending power of a UE; the base station sends to the UE indication information and the adjustment value for the uplink sending power of the UE, where the indication information is used for indicating a range of the adjustment value for the uplink sending power of the UE, so that the UE, according to the indication information and the adjustment value for the uplink sending power of the UE, determines the uplink sending power of the (Continued)

UE. Embodiments of the present invention are capable of improving the quality of sending uplink data.

18 Claims, 3 Drawing Sheets

(51) Int. Cl.

| | | |
|---|---|---|
| *H04W 52/14* | (2009.01) | |
| *H04W 52/40* | (2009.01) | |
| *H04W 52/36* | (2009.01) | |
| *H04B 7/024* | (2017.01) | |
| *H04W 52/32* | (2009.01) | |
| *H04W 52/50* | (2009.01) | |
| *H04W 52/58* | (2009.01) | |
| *H04L 5/00* | (2006.01) | |

(52) U.S. Cl.
CPC ....... *H04W 52/362* (2013.01); *H04W 52/367* (2013.01); *H04W 52/40* (2013.01); *H04B 7/024* (2013.01); *H04L 5/0035* (2013.01); *H04W 52/248* (2013.01); *H04W 52/325* (2013.01); *H04W 52/50* (2013.01); *H04W 52/58* (2013.01)

(58) Field of Classification Search
CPC . H04W 24/00; H04W 52/242; H04W 52/146; H04W 52/248; H04W 52/40; H04W 52/325; H04W 52/367; H04W 52/50; H04W 52/58; H04W 52/247; H04W 52/362; H04L 43/50; H04L 43/08; H04L 43/0852; H04L 5/0035; H04B 7/18543; H04B 17/003; H04B 7/024
USPC ............. 370/329, 341, 318, 252, 310.2, 328
See application file for complete search history.

(56) References Cited

U.S. PATENT DOCUMENTS

2008/0280638 A1* 11/2008 Malladi ................. H04W 52/08
455/522
2010/0232373 A1* 9/2010 Nory ................. H04W 72/1289
370/329
2010/0254276 A1* 10/2010 Nishikawa ............ H04L 1/0029
370/252
2011/0261716 A1* 10/2011 Kim ..................... H04B 7/0671
370/252
2012/0052904 A1* 3/2012 Gao ....................... H04W 52/40
455/522

FOREIGN PATENT DOCUMENTS

| CN | 101883415 A | 11/2010 |
|---|---|---|
| CN | 102291812 A | 12/2011 |
| CN | 102811478 A | 12/2012 |
| EP | 2429244 A1 | 3/2012 |
| WO | WO 2010098593 A2 | 9/2010 |
| WO | WO 2010127623 A1 | 11/2010 |

OTHER PUBLICATIONS

"Introduction of Rel-10 LTE-Advanced features in 36.213," 3GPP TSG-RAN Meeting #62, Madrid, Spain, Draft Change Request, Document R1-104957, $3^{rd}$ Generation Partnership Project, Valbonne, France (Aug. 23-27, 2010).

"3GPP TS 36.213—$3^{rd}$ Generation Partnership Project; Technical Specification Group Radio Access Network; Evolved Universal Terrestrial Radio Access (E-UTRA); Physical layer procedures (Release 10)," Version 10.2.0, $3^{rd}$ Generation Partnership Project, Valbonne, France (Jun. 2011).

"3GPP TS 36.331—$3^{rd}$ Generation Partnership Project; Technical Specification Group Radio Access Network; Evolved Universal Terrestrial Radio Access (E-UTRA); Radio Resource Control (RRC); Protocol specification (Release 10)," Version 10.2.0, $3^{rd}$ Generation Partnership Project, Valbonne, France (Jun. 2011).

"$3^{rd}$ Generation Partnership Project; Technical Specification Group Radio Access Network; Evolved Universal Terrestrial Radio Access (E-UTRA); Physical layer procedures (Release 8)," 3GPP TS 36.213, V8.3.0, pp. 8-13, $3^{rd}$ Generation Partnership Project, Valbonne, France (May 2008).

* cited by examiner

COMPENSATION METHOD, BASE STATION, AND USER EQUIPMENT FOR UPLINK POWER CONTROL IN A COMP SYSTEM

CROSS-REFERENCE TO RELATED APPLICATIONS

This application is a continuation of International Patent Application No. PCT/CN2012/080242, filed on Aug. 16, 2012, which claims priority to Chinese patent application No. 201110234795.9, filed on Aug. 16, 2011, both of which are incorporated herein by reference in their entireties.

TECHNICAL FIELD

Embodiments of the present invention relate to the field of communication technology, and more particularly to a compensation method, a base station, and a user equipment for uplink power control in a coordinated multi-point transmission (Coordinated Multi-Point, CoMP) system.

BACKGROUND

In a communication system, such as a long term evolution (Long Term Evolution, LTE) system and a long term evolution advanced (Long Term Evolution Advanced, LTE-A) system, for the purpose that different user equipments (User Equipment, UE) can have receiving powers approximately at a same level when arriving at an evolved Node B (Evolved Node B, eNB), to avoid interference between user equipments due to a far-near effect, uplink power control according to a path loss (Path Loss, PL) acquired by a reference signal receiving power (Reference Signal Receiving Power, RSRP) is usually performed for a UE.

In a coordinated multi-point transmission (Coordinated Multi-Point, CoMP) system, however, a data receiving point for uplink data transmission might be inconsistent with a data sending point for downlink data transmission, and the path losses to be compensated are also different. The existing method for calculating the path loss fails to satisfy this function, and then the uplink power control according to a path loss acquired based on the prior art by the UE may be not precise enough, thereby reducing the quality of sending uplink data.

SUMMARY

Embodiments of the present invention provide a compensation method, a base station, and a user equipment for uplink power control in a CoMP system, so as to improve quality of sending uplink data.

One aspect of the present invention provides a compensation method for uplink power control in a CoMP system, including:

a base station determines an adjustment value for an uplink sending power of a UE; and the base station sends to the UE, indication information and the adjustment value for the uplink sending power of the UE, where the indication information is used for indicating a range of the adjustment value for the uplink sending power of the UE, so that the UE, according to the indication information and the adjustment value for the uplink sending power of the UE, determines the uplink sending power of the UE.

Another aspect of the present invention provides a compensation method for uplink power control in a CoMP system, including:

a user equipment UE receives indication information and an adjustment value for an uplink sending power of the UE, sent by a base station, where the indication information is used for indicating a range of the adjustment value for the uplink sending power of the UE; and the UE determines the uplink sending power of the UE according to the indication information and the adjustment value for the uplink sending power of the UE.

Still another aspect of the invention provides a base station, including:

a determination unit, configured to determine an adjustment value for an uplink sending power of a user equipment UE; and a sending unit, configured to send to the UE indication information and the adjustment value for the uplink sending power of the UE determined by the determination unit, where the indication information is used for indicating a range of the adjustment value for the uplink sending power of the UE, so that the UE, according to the indication information and the adjustment value for the uplink sending power of the UE, determines the uplink sending power of the UE.

Yet another aspect of the invention provides a UE, including:

a receiving unit, configured to receive indication information and an adjustment value for an uplink sending power of the UE, sent by a base station, where the indication information is used for indicating a range of the adjustment value for the uplink sending power of the UE; and a processing unit, configured to determine, the uplink sending power of the UE according to the indication information and the adjustment value for the uplink sending power of the UE received by the receiving unit.

It can be known from the above technical solutions that, in embodiments of the present invention, after determining the adjustment value for the uplink sending power of the UE, the base station sends to the UE indication information for indicating a range of the adjustment value for the uplink sending power of the UE and the adjustment value for the uplink sending power of the UE, so that the UE, according to the indication information and the adjustment value for the uplink sending power of the UE, can determine the uplink sending power of the UE and avoid the problem in the prior art that the uplink power control through a path loss acquired by the UE is not precise enough because, in a CoMP system, a data receiving point for uplink data transmission might be inconsistent with a data sending point for downlink data transmission, thereby improving the quality of sending uplink data.

BRIEF DESCRIPTION OF DRAWINGS

In order to illustrate embodiments of the present invention or the technical solution in the prior art more clearly, accompanying drawings needed for describing the embodiments or the prior art will be introduced in brief hereinafter. Apparently, the accompanying drawings show certain embodiments of the present invention, and persons skilled in the art can derive other drawings from them without creative efforts.

DESCRIPTION OF EMBODIMENTS

In order to make the objects, technical solutions, and advantages of embodiments of the present invention clearer, the technical solutions in the embodiments of the present invention are hereinafter described clearly and completely with reference to the accompanying drawings in the embodiments of the present invention. Obviously, the embodiments described here are part of the embodiments of the present invention and not all of the embodiments. All other embodiments obtained by persons skilled in the art on the basis of the embodiments of the present invention without any creative efforts all fall within the scope of the present invention.

Figure 1:
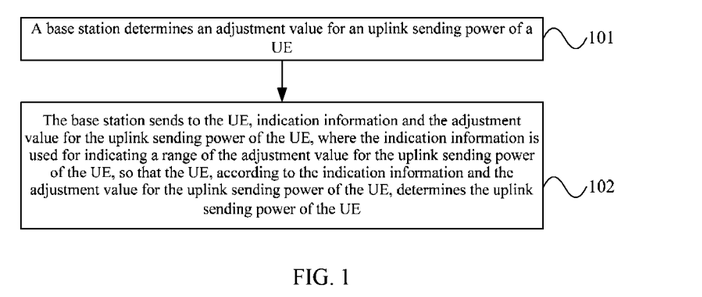
FIG. 1 is a schematic flow chart of a compensation method for uplink power control in a CoMP system provided by an embodiment of the present invention.

FIG. 1 is a schematic flow chart of a compensation method for uplink power control in a CoMP system provided by an embodiment of the present invention, as shown in FIG. 1, the compensation method for the uplink power control in the CoMP system in this embodiment can include:

101, A base station determines an adjustment value for an uplink sending power of a UE;

For example, the base station, according to a path loss (target path loss) obtained through a theoretical calculation and a path loss obtained through a measurement of an RSRP, can acquire a path loss difference (that is, the path loss obtained through the theoretical calculation minus the path loss obtained through the measurement of the RSRP), and take the path loss difference as the adjustment value for the uplink sending power of the UE for uplink power control.

To illustrate the method in this embodiment of the present invention more clearly, the fourth scenario in the CoMP system is taken as an example hereinafter. The fourth scenario in the CoMP system is that: a macro site (Macro Site) and a radio remote head (Radio Remote Head, RRH) within a macro site area make up a cell. Provided that a set of the macro site and the RRH which actually participate in uplink joint reception is represented by an R, the target path loss $PL_C$ calculated by the base station through the theoretical calculation is expressed as below:

$$PL_c = -10\ \log_{10}\left(\sum_{i \in R} 10^{-\frac{PL_i}{10}}\right),$$

where $PL_i$ is a path loss from the macro site or the RRH to the UE.

Specifically, the adjustment value for the uplink sending power of the UE, determined by the base station, can include at least one of the followings:

the adjustment value for the uplink sending power of the UE for uplink power control of a physical uplink shared channel (Physical Uplink Shared Channel, PUSCH), namely $P_{O\_PUSCH}(j)$ in formula $$P_{PUSCH}(i) = \min\left\{\begin{array}{l}P_{CMAX}, \\ 10\ \log_{10}(M_{PUSCH}(i)) + P_{O\_PUSCH}(j) + \\ \alpha(j) \cdot PL_C + \Delta_{TF}(i) + f(i)\end{array}\right\};$$

the adjustment value for the uplink sending power of the UE for uplink power control of a physical uplink control channel (Physical Uplink Control Channel, PUCCH), namely $P_{O\_PUCCH}$ in formula $$P_{PUCCH}(i) = \min\left\{\begin{array}{l}P_{CMAX}, \\ P_{O\_PUCCH} + PL_C + h(n_{CQI}, n_{HARQ}, n_{SR}) + \\ \Delta_{F\_PUCCH}(F) + \Delta_{TxD}(F') + g(i)\end{array}\right\};$$

the adjustment value for the uplink sending power of the UE for uplink power control of a sounding reference signal (Sounding Reference Signal, SRS), specifically, the adjustment value for the uplink sending power of the UE can include at least one of the adjustment value for the uplink sending power of the UE associated with a PUSCH and an adjustment value for the uplink sending power of the UE associated with an SRS, namely at least one of the $P_{SRS\_OFFSET}$ and $P_{O\_PUSCH}(j)$ in formula $$P_{SRS}(i) = \min\left\{\begin{array}{l}P_{CMAX}, \\ P_{SRS\_OFFSET} + 10\ \log_{10}(M_{SRS}) + \\ P_{O\_PUSCH}(j) + \alpha(j) \cdot PL_C + f(i)\end{array}\right\};$$

Where, i represents a subframe, j represents a type of a packet within the cell, $P_{CMAX}$ represents a maximum allowable power, $M_{PUSCH}(i)$ is a bandwidth for PUSCH transmission, $P_{O\_PUSCH}(j)$ and $P_{O\_PUCCH}(j)$ are nominal powers semi-statically set by the base station for all the UEs within the cell, $\alpha(j)$ is a path loss compensation factor, $PL_C$ is a target path loss, $\Delta_{TF}(i)$ is a power offset based on modulation encoding mode and data type, and f(i) represents a closed-loop adjustment portion of power control. $n_{CQI}$ is a bit number of channel quality information, $n_{HARQ}$ is a bit number of a hybrid automatic repeat request, $n_{SR}$ is a bit number of a scheduling request, $h(n_{CQI}, n_{HARQ}, n_{SR})$ is a value based on a PUCCH format, F and F' are of PUCCH format, $\Delta_{F\_PUCCH}(F)$ is a value of PUCCH format F relative to PUCCH format 1a, $\Delta_{TxD}(F')$ is a value associated with PUCCH transmission, g(i) is a state adjustment factor of PUCCH power control, $P_{SRS\_OFFSET}$ represents an offset of a sending power for the SRS, and $M_{SRS}$ represents a bandwidth of the SRS.

102, The base station sends to the UE, indication information and the adjustment value for the uplink sending power of the UE, where the indication information is used for indicating a range of the adjustment value for the uplink sending power of the UE, so that the UE, according to the indication information and the adjustment value for the uplink sending power of the UE, determines the uplink sending power of the UE.

It should be noted that, the execution sequences for 101 and sending the indication information to the UE by the base station in 102 are not fixed, the base station can send the indication information to the UE before determining the adjustment value for the uplink sending power of the UE, or after determining the adjustment value for the uplink sending power of the UE, and this embodiment is not limited thereto.

Optionally, the base station can send the indication information for indicating a range of the adjustment value for the uplink sending power of the UE to the UE in various ways. For example, the base station can send the indication information for indicating the range of the adjustment value for the uplink sending power of the UE to the UE through higher layer signaling. For another example, the base station also can send the indication information for indicating the range of the adjustment value for the uplink sending power of the UE to the UE through new ordinary signaling in a physical downlink control channel (Physical Downlink Control Channel, PDCCH).

Specifically, the adjustment value for the uplink sending power of the UE is identified by at least 4 bits, and a step of the identified adjustment value for the uplink sending power of the UE is greater than or equal to 1 dB. For example, if it is identified by 4 bits and a step of 1 dB, the identified power range can be −8 dB~7 dB; if it is identified by 4 bits and a step of 2 dB, the identified power range can be −23 dB~7 dB; for another example, if it is identified by 5 bits and a step of 1 dB, the identified power range can be −24 dB~7 dB.

In this embodiment of the present invention, after determining the adjustment value for the uplink sending power of the UE, the base station sends the indication information for indicating a range of the adjustment value for the uplink sending power of the UE to the UE and the adjustment value for the uplink sending power of the UE, so that the UE, according to the indication information and the adjustment value for the uplink sending power of the UE, can determine the uplink sending power of the UE and avoid the problem in the prior art that the uplink power control according to a path loss acquired by the UE is not precise enough because, in a CoMP, system a data receiving point for uplink data transmission might be inconsistent with a data sending point for downlink data transmission, thereby improving the quality of sending uplink data.

Figure 2:
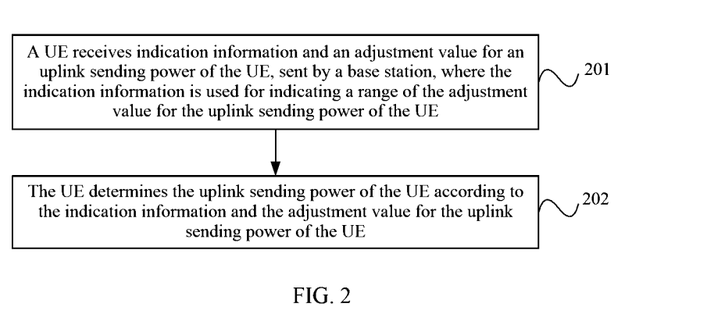
FIG. 2 is a schematic flow chart of a compensation method for uplink power control in a CoMP system provided by another embodiment of the present invention.

FIG. 2 is a schematic flow chart of a compensation method for uplink power control in a CoMP system according to another embodiment of the present invention, as shown in FIG. 2, the compensation method for the uplink power control in the CoMP system in this embodiment can include:

201, A UE receives indication information and an adjustment value for an uplink sending power of the UE, sent by a base station, where the indication information is used for indicating a range of the adjustment value for the uplink sending power of the UE;

Where, the adjustment value for the uplink sending power of the UE is determined by the base station, and reference for the specific method can be made to relevant contents in the embodiment corresponding to FIG. 1, which will be not repeated herein.

Specifically, the adjustment value for the uplink sending power of the UE, received by the UE and sent by the base station, can include at least one of the followings:

the adjustment value for the uplink sending power of the UE for uplink power control of a physical uplink shared channel (Physical Uplink Shared Channel, PUSCH), namely $P_{O\_PUSCH}(j)$ in formula $$P_{PUSCH}(i) = \min\left\{\begin{array}{l}P_{CMAX},\\ 10\ \log_{10}(M_{PUSCH}(i)) + P_{O\_PUSCH}(j) +\\ \alpha(j)\cdot PL_C + \Delta_{TF}(i) + f(i)\end{array}\right\};$$

the adjustment value for the uplink sending power of the UE for uplink power control of a physical uplink control channel (Physical Uplink Control Channel, PUCCH), namely $P_{O\_PUCCH}$ in formula $$P_{PUCCH}(i) = \min\left\{\begin{array}{l}P_{CMAX},\\ P_{O\_PUCCH} + PL_C + h(n_{CQI}, n_{HARQ}, n_{SR}) +\\ \Delta_{F\_PUCCH}(F) + \Delta_{TxD}(F') + g(i)\end{array}\right\};$$

the adjustment value for the uplink sending power of the UE for uplink power control of a sounding reference signal (Sounding Reference Signal, SRS), specifically, the adjustment value for the uplink sending power of the UE can include at least one of the adjustment value for the uplink sending power of the UE associated with a PUCCH and an adjustment value for the uplink sending power of the UE associated with an SRS, namely at least one of the $P_{SRS\_OFFSET}$ and $P_{O\_PUSCH}(j)$ in formula $$P_{SRS}(i) = \min\left\{\begin{array}{l}P_{CMAX},\\ P_{SRS\_OFFSET} + 10\ \log_{10}(M_{SRS}) +\\ P_{O\_PUSCH}(j) + \alpha(j)\cdot PL_C + f(i)\end{array}\right\};$$

Where, i represents a subframe, j represents a type of a packet within the cell, $P_{CMAX}$ represents a maximum allowable power, $M_{PUSCH}(i)$ is a bandwidth for PUSCH transmission, $P_{O\_PUSCH}(j)$ and $P_{O\_PUCCH}(j)$ are nominal powers semi-statically set by the base station for all the UEs within the cell, $\alpha(j)$ is a path loss compensation factor, $PL_C$ is a target path loss, $\Delta_{TF}(i)$ is a power offset based on modulation encoding mode and data type, and f(i) represents a closed-loop adjustment portion of power control. $n_{CQI}$ is a bit number of channel quality information, $n_{HARQ}$ is a bit number of a hybrid automatic repeat request, $n_{SR}$ is a bit number of a scheduling request, $h(n_{CQI}, n_{HARQ}, n_{SR})$ is a value based on a PUCCH format, F and F' are of PUCCH format, $\Delta_{F\_PUCCH}(F)$ is a value of PUCCH format F relative to PUCCH format 1a, $\Delta_{TxD}(F')$ is a value associated with PUCCH transmission, g(i) is a state adjustment factor of PUCCH power control, $P_{SRS\_OFFSET}$ represents an offset of a sending power for the SRS, and $M_{SRS}$ represents a bandwidth of the SRS.

202, The UE determines the uplink sending power of the UE according to the indication information and the adjustment value for the uplink sending power of the UE.

Optionally, the UE can receive the indication information for indicating a range of the adjustment value for the uplink sending power of the UE, sent by the base station, in various ways. For example, the UE can receive indication information for indicating a range of the adjustment value for the uplink sending power of the UE sent by the base station through higher layer signaling. For another example, the UE also can receive the indication information for indicating the range of the adjustment value for the uplink sending power of the UE sent by the base station through new ordinary signaling in a PDCCH.

Specifically, the adjustment value for the uplink sending power of the UE is identified by at least 4 bits, and a step of the identified adjustment value for the uplink sending power of the UE is greater than or equal to 1 dB. For example, if it is identified by 4 bits and a step of 1 dB, the identified power range can be −8 dB~7 dB; if it is identified by 4 bits and a step of 2 dB, the identified power range can be −23 dB~7 dB; for another example, if it is identified by 5 bits and a step of 1 dB, the identified power range can be −24 dB~7 dB.

In this embodiment of the present invention, the UE receives indication information for indicating a range of the adjustment value for the uplink sending power of the UE and the adjustment value for the uplink sending power of the UE, sent by the base station, so that the UE, according to the indication information and the adjustment value for the uplink sending power of the UE, can determine the uplink sending power of the UE and avoid the problem in the prior art that the uplink power control according to a path loss acquired by the UE is not precise enough because, in a CoMP system, a data receiving point for uplink data transmission might be inconsistent with a data sending point for downlink data transmission, thereby improving the quality of sending uplink data.

The technical solution of the present invention may be applied to various communication systems, for example, a global system for mobile communication (Global System for Mobile Communications, GSM) system, a general packet radio service (General Packet Radio Service, GPRS) system, a code division multiple access (Code Division Multiple Access, CDMA) system, a wideband code division multiple access (Wideband Code Division Multiple Access, WCDMA) system, a time division-synchronous code division multiple access (Time Division-Synchronous Code Division Multiple Access, TD-SCDMA) system, a long term evolution (Long Term Evolution, LTE) system and so on.

Where, the base station can be a base transceiver station (Base Transceiver Station, BTS) in the GSM system, GPRS system or CDMA system, or can be a node B (Node B) in the WCDMA system, or can be an evolutional node B (Evolutional Node B, eNB or eNodeB) in the LTE system.

It should be noted that, for simplicity of description, the above method embodiments are described as a set of a series of operations, but it should be appreciated by persons skilled in the art that the sequences of operations described herein shall not be construed as limitation on the present invention because certain steps may occur in different order or occur simultaneously according to the present invention. Also, it should also be appreciated by persons skilled in the art that the embodiments described in the specification belong to preferred embodiments, so the associated operations and modules are not necessary for the present invention.

In the foregoing embodiments, each embodiment emphasizes a specific aspect, and the part not detailed in one embodiment may be detailed in another embodiment.

Figure 3:
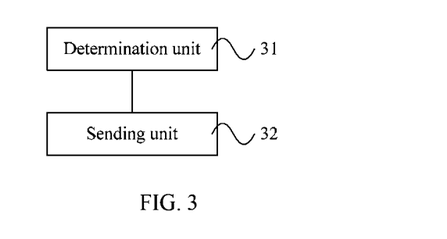
FIG. 3 is a schematic structural diagram of a base station provided by another embodiment of the present invention.

FIG. 3 is a schematic structural diagram of a base station according to another embodiment of the present invention, as shown in FIG. 3, the base station in this embodiment can include a determination unit 31 and a sending unit 32. The determination unit 31 is configured to determine an adjustment value for an uplink sending power of a UE; the sending unit 32 is configured to send to the UE indication information and the adjustment value for the uplink sending power of the UE determined by the determination unit 31, where the indication information is used for indicating a range of the adjustment value for the uplink sending power of the UE determined by the determination unit 31, so that the UE, according to the indication information and the adjustment value for the uplink sending power of the UE, determines the uplink sending power of the UE.

The function of the base station in the embodiment corresponding to FIG. 1 can be implemented by the base station provided in this embodiment.

Specifically, the sending unit 32 in this embodiment can send to the UE the indication information through higher layer signaling; or can send to the UE the indication information through PDCCH.

Optionally, the adjustment value for the uplink sending power of the UE determined by the determination unit 31 in this embodiment can be identified by 4 bits, and a step of the adjustment value for the uplink sending power of the UE identified by 4 bits is greater than or equal to 1 dB; or can be identified by more than 4 bits, and a step of the adjustment value for the uplink sending power of the UE identified by more than 4 bits is greater than or equal to 1 dB.

Figure 4:
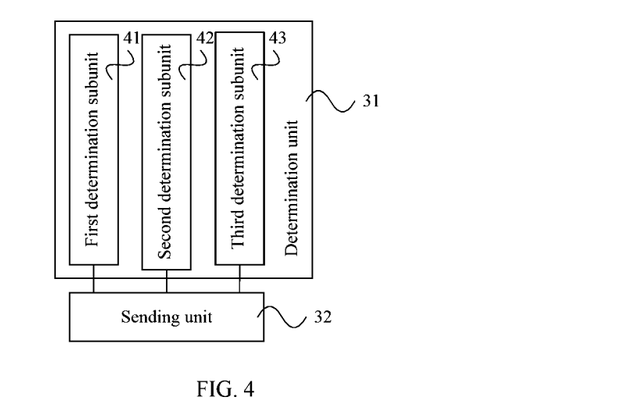
FIG. 4 is a schematic structural diagram of a base station provided by another embodiment of the present invention.

Specifically, as shown in FIG. 4, the determination unit in this embodiment can include at least one subunit of the followings: a first determination subunit 41, a second determination subunit 42 and a third determination subunit 43. Where, the first determination subunit 41 is configured to determine the adjustment value for the uplink sending power of the UE, for uplink power control of a PUSCH;

the second determination subunit 42 is configured to determine the adjustment value for the uplink sending power of the UE, for uplink power control of a PUCCH;

the third determination subunit 43 is configured to determine the adjustment value for the uplink sending power of the UE, for uplink power control of an SRS.

It should be noted that, FIG. 4 merely illustrates a case when the first determination subunit 41, the second determination subunit 42 and the third determination subunit 43 are included at the same time, and also, in an optional embodiment, only one or two of the above three subunits can be included.

Figure 5:
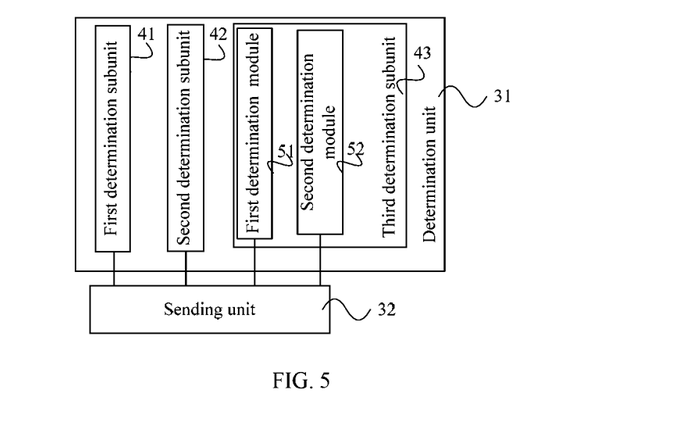
FIG. 5 is a schematic structural diagram of a base station provided by another embodiment of the present invention.

As shown in FIG. 5, the third determination subunit 43 can include at least one module of the followings: a first determination module 51 and a second determination module 52. Where, the first determination module 51 is configured to determine the adjustment value for the uplink sending power of the UE associated with a PUSCH, for uplink power control of an SRS;

the second determination module 52 is configured to determine the adjustment value for the uplink sending power of the UE associated with an SRS, for uplink power control of the SRS.

It should be noted that, FIG. 5 merely illustrates a case when the first determination module 51 and the second determination module 52 are included at the same time, and also, in an optional embodiment, only one of the above two modules can be included.

In this embodiment, after the determination unit determines the adjustment value for the uplink sending power of the UE, the base station sends to the UE the indication information for indicating a range of the adjustment value for the uplink sending power of the UE and the adjustment value for the uplink sending power of the UE through the sending unit, so that the UE, according to the indication information and the adjustment value for the uplink sending power of the UE, can determine the uplink sending power of the UE and avoid the problem in the prior art that the uplink power control according to a path loss acquired by the UE is not precise enough because, in a CoMP system, a data receiving point for uplink data transmission might be inconsistent with a data sending point for downlink data transmission, thereby improving the quality of sending uplink data.

Reference for other structures and functions of the base station can be made to the above-mentioned method embodiments.

Figure 6:
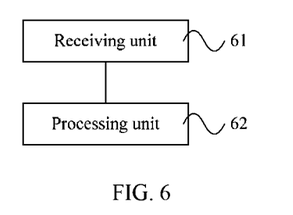
FIG. 6 is a schematic structural diagram of a UE provided by another embodiment of the present invention.

FIG. 6 is a schematic structural diagram of a UE according to another embodiment of the present invention, as shown in FIG. 6, the UE in this embodiment can include a receiving unit 61 and a processing unit 62. The receiving unit 61 is configured to receive indication information and an adjustment value for an uplink sending power of the UE, sent by a base station, where the indication information is used for indicating a range of the adjustment value for the uplink sending power of the UE; the processing unit 62 is configured to determine an uplink sending power of the UE according to the indication information and the adjustment value for the uplink sending power of the UE received by the receiving unit 61.

The function of the UE in the embodiment corresponding to FIG. 2 can be implemented by the UE provided in this embodiment.

Specifically, the receiving unit 61 in this embodiment can receive the indication information sent by the base station through higher layer signaling; or can receive the indication information sent by the base station through PDCCH.

Optionally, the adjustment value for the uplink sending power of the UE received by the receiving unit 61 in this embodiment can be identified by 4 bits, and a step of the adjustment value for the uplink sending power of the UE identified by 4 bits is greater than or equal to 1 dB; or can be identified by more than 4 bits, and a step of the adjustment value for the uplink sending power of the UE identified by more than 4 bits is greater than or equal to 1 dB.

Figure 7:
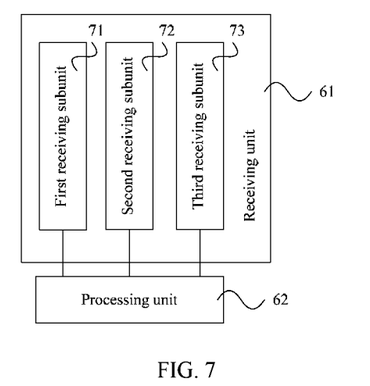
FIG. 7 is a schematic structural diagram of a UE provided by another embodiment of the present invention.

Specifically, as shown in FIG. 7, the receiving unit 61 in this embodiment can include at least one subunit of the followings: a first receiving subunit 71, a second receiving subunit 72 and a third receiving subunit 73. Where, the first receiving subunit 71 is configured to receive the adjustment value for the uplink sending power of the UE, for uplink power control of a PUSCH, sent by the base station;

the second receiving subunit 72 is configured to receive the adjustment value for the uplink sending power of the UE, for uplink power control of a PUCCH, sent by the base station; and the third receiving subunit 73 is configured to receive the adjustment value for the uplink sending power of the UE, for uplink power control of an SRS, sent by the base station.

It should be noted that, FIG. 7 merely illustrates a case when the first receiving subunit 71, the second receiving subunit 72 and the third receiving subunit 73 are included at the same time, and also, in an optional embodiment, only one or two of the above three subunits can be included.

Figure 8:
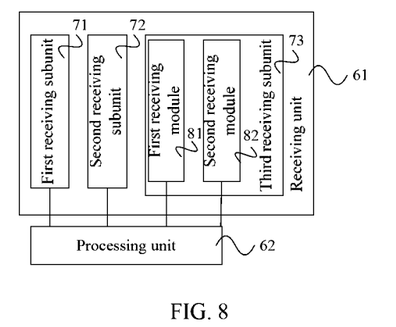
FIG. 8 is a schematic structural diagram of a UE provided by another embodiment of the present invention.

As shown in FIG. 8, the third receiving subunit 73 can include at least one module of the followings: a first receiving module 81 and a second receiving module 82. Where, the first receiving module 81 is configured to receive the adjustment value for the uplink sending power of the UE associated with a PUSCH, for uplink power control of an SRS, sent by the base station; and the second receiving module 82 is configured to receive the adjustment value for the uplink sending power of the UE associated with an SRS, for uplink power control of the SRS, sent by the base station.

It should be noted that, FIG. 8 merely illustrates a case when the first receiving module 81 and the second receiving module 82 are included at the same time, and also, in an optional embodiment, only one of the above two modules can be included.

In this embodiment, the UE receives, by the receiving unit, indication information for indicating a range of the adjustment value for the uplink sending power of the UE and the adjustment value for the uplink sending power of the UE, sent by the base station, so that the processing unit, according to the indication information and the adjustment value for the uplink sending power of the UE, can determine the uplink sending power of the UE and avoid the problem in the prior art that the uplink power control according to a path loss acquired by the UE is not precise enough because, in a CoMP system, a data receiving point for uplink data transmission might be inconsistent with a data sending point for downlink data transmission, thereby improving the quality of sending uplink data.

Reference for other structures and functions of the base station can be made to the above-mentioned method embodiments.

Persons skilled in the art can clearly know that, for convenience and brevity of description, the detailed working procedures of the systems, devices, and units described above can be referred to the corresponding procedures in the method embodiments, and are not repeated herein.

Understandably, in the embodiments described herein, the disclosed systems, devices and methods may be implemented in other ways. For example, the device embodiments above are illustrative in nature, and the units are divided from the perspective of logical functions only and may be divided in a different way in practical application. For example, multiple units or components may be combined or integrated into another system, or some features may be ignored or not executed. Besides, the coupling or direct coupling or communication connection illustrated or discussed herein may be implemented through some interfaces, and indirect coupling or communication connection between devices or units may be electronic, mechanical, or in other forms.

The units described as stand-alone components above may be separated physically or not from each other; and the components illustrated as units may be physical units or not, namely, they may be located in one place, or distributed on multiple network elements. Some or all of the units described above may be selected as required to fulfill the objectives of the technical solutions of the present invention.

Besides, all functional units in the embodiments of the present invention may be physically stand-alone, or integrated into a processing module, or two or more of the units are integrated into one unit. The integrated unit above can be implemented in hardware, or a combination of hardware and software function units.

The integrated unit above implemented as a software function unit can be stored in a computer-readable storage medium. The software function unit above is stored in a storage medium and incorporates several instructions causing a computer device (for example, personal computer, server, or network device) to execute part of the steps of the method according to each embodiment of the present invention. Examples of the storage medium include various media capable of storing program codes, such as a USB flash disk, a mobile hard disk, a read-only memory (Read-Only Memory, ROM), a random access memory (Random Access Memory, RAM), a magnetic disk, or an optical disk.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the scope of the technical solutions of the embodiments of the present invention.

What is claimed is:

1. A compensation method for uplink power control in a coordinated multi-point (CoMP) transmission system, comprising:
   determining, by a base station, an adjustment value for an uplink sending power of a user equipment (UE); and
   sending, by the base station to the UE, indication information and the adjustment value for the uplink sending power of the UE, wherein the indication information is used for indicating a range of the adjustment value for the uplink sending power of the UE, so that the UE, according to the indication information and the adjustment value for the uplink sending power of the UE, determines the uplink sending power of the UE, wherein the adjustment value for the uplink sending power of the UE is identified by more than 4 bits, and a step of the adjustment value for the uplink sending power of the UE identified by the more than 4 bits is greater than or equal to 1 dB.

2. The method according to claim 1, wherein sending, by the base station to the UE, the indication information comprises:
   sending, by the base station, the indication information to the UE through higher layer signaling; or sending, by the base station, the indication information to the UE through a physical downlink control channel (PDCCH).

3. The method according to claim 1, wherein determining, by the base station, the adjustment value for the uplink sending power of the user equipment UE comprises at least one of the following:
   determining, by the base station, the adjustment value for the uplink sending power of the UE, for uplink power control of a physical uplink shared channel (PUSCH);
   determining, by the base station, the adjustment value for the uplink sending power of the UE, for uplink power control of a physical uplink control channel (PUCCH); and
   determining, by the base station, the adjustment value for the uplink sending power of the UE, for uplink power control of a sounding reference signal (SRS).

4. The method according to claim 3, wherein determining, by the base station, the adjustment value for the uplink sending power of the UE, for the uplink power control of the SRS, comprises at least one of the following:
   determining, by the base station, the adjustment value for the uplink sending power of the UE associated with a PUSCH, for the uplink power control of the SRS; and
   determining, by the base station, the adjustment value for the uplink sending power of the UE associated with the SRS, for the uplink power control of the SRS.

5. The method according to claim 1, wherein determining, by the base station, the adjustment value for the uplink sending power of the UE, comprises at least one of the following:
   $P_{O\_PUSCH}(j)$ in a formula $$P_{PUSCH}(i) = \min\begin{Bmatrix} P_{CMAX}, \\ 10\log_{10}(M_{PUSCH}(i)) + P_{O\_PUSCH}(j) + \\ \alpha(j) \cdot PL_C + \Delta_{TF}(i) + f(i) \end{Bmatrix};$$

$P_{O\_PUCCH}$ in a formula $$P_{PUCCH}(i) = \min\begin{Bmatrix} P_{CMAX}, \\ P_{O\_PUCCH} + PL_C + h(n_{CQI}, n_{HARQ}, n_{SR}) + \\ \Delta_{F\_PUCCH}(F) + \Delta_{T \times D}(F') + g(i) \end{Bmatrix};$$

at least one of $P_{SRS\_OFFSET}$ and $P_{O\_PUSCH}(j)$ in a formula $$P_{SRS}(i) = \min\begin{Bmatrix} P_{CMAX}, \\ P_{SRS\_OFFSET} + 10\log_{10}(M_{SRS}) + \\ P_{O\_PUSCH}(j) + \alpha(j) \cdot PL_C + f(i) \end{Bmatrix};$$

where i represents a subframe, j represents a type of a packet within a cell, $P_{CMAX}$ represents a maximum allowable power, $M_{PUSCH}(i)$ is a bandwidth for PUSCH transmission, $\alpha(j)$ is a path loss compensation factor, $PL_C$ is a target path loss, $\Delta_{TF}(i)$ is a power offset based on modulation encoding mode and data type, and f(i) represents a closed-loop adjustment portion of power control, $n_{CQI}$ is a bit number of channel quality information, $n_{HARQ}$ is a bit number of a hybrid automatic repeat request, $n_{SR}$ is a bit number of a scheduling request, $h(n_{CQI}, n_{HARQ}, n_{SR})$ is a value based on a PUCCH format, F and F' are of PUCCH format, $\Delta_{F\_PUCCH}(F)$ is a value of PUCCH format F relative to PUCCH format 1a, $\Delta_{T \times D}(F')$ is a value associated with PUCCH transmission, g(i) is a state adjustment factor of PUCCH power control, and $M_{SRS}$ represents a bandwidth of the SRS.

6. A compensation method for uplink power control in a coordinated multi-point (CoMP) transmission system, comprising:
   receiving, by a user equipment (UE), indication information and an adjustment value for an uplink sending power of the UE, sent by a base station, wherein the indication information is used for indicating a range of the adjustment value for the uplink sending power of the UE; and
   determining, by the UE, the uplink sending power of the UE according to the indication information and the adjustment value for the uplink sending power of the UE, wherein the adjustment value for the uplink sending power of the UE is identified by more than 4 bits, and a step of the adjustment value for the uplink sending power of the UE identified by the more than 4 bits is greater than or equal to 1 dB.

7. The method according to claim 6, wherein receiving, by the UE, the indication information sent by the base station comprises:
   receiving, by the UE, the indication information sent by the base station through higher layer signaling; or receiving, by the UE, the indication information sent by the base station through a physical downlink control channel (PDCCH).

8. The method according to claim 6, wherein receiving, by the UE, the adjustment value for the uplink sending power of the UE sent by the base station comprises at least one of the following:
   receiving, by the UE, the adjustment value for the uplink sending power of the UE, for uplink power control of a physical uplink shared channel (PUSCH), sent by the base station;
   receiving, by the UE, the adjustment value for the uplink sending power of the UE, for uplink power control of a physical uplink control channel (PUCCH), sent by the base station; and
   receiving, by the UE, the adjustment value for the uplink sending power of the UE, for uplink power control of a sounding reference signal (SRS), sent by the base station.

9. The method according to claim 8, wherein receiving, by the UE, the adjustment value for the uplink sending power of the UE, for uplink power control of the SRS, sent by the base station, comprises at least one of the following:
   receiving, by the UE, the adjustment value for the uplink sending power of the UE associated with the PUSCH, for the uplink power control of the SRS, sent by the base station; and
   receiving, by the UE, the adjustment value for the uplink sending power of the UE associated with the SRS, for the uplink power control of the SRS, sent by the base station.

10. The method according to claim 6, wherein receiving, by the UE, the adjustment value for the uplink sending power of the UE sent by the base station comprises at least one of the following:
$P_{O\_PUSCH}(j)$ in a formula $$P_{PUSCH}(i) = \min\begin{Bmatrix} P_{CMAX}, \\ 10\log_{10}(M_{PUSCH}(i)) + P_{O\_PUSCH}(j) + \\ \alpha(j) \cdot PL_C + \Delta_{TF}(i) + f(i) \end{Bmatrix};$$

$P_{O\_PUCCH}$ in a formula $$P_{PUCCH}(i) = \min\begin{Bmatrix} P_{CMAX}, \\ P_{O\_PUCCH} + PL_C + h(n_{CQI}, n_{HARQ}, n_{SR}) + \\ \Delta_{F\_PUCCH}(F) + \Delta_{T \times D}(F') + g(i) \end{Bmatrix};$$

at least one of $P_{SRS\_OFFSET}$ and $P_{O\_PUSCH}$ in a formula $$P_{SRS}(i) = \min\begin{Bmatrix} P_{CMAX}, \\ P_{SRS\_OFFSET} + 10\log_{10}(M_{SRS}) + \\ P_{O\_PUSCH}(j) + \alpha(j) \cdot PL_C + f(i) \end{Bmatrix};$$

wherein i represents a subframe, j represents a type of a packet within a cell, $P_{CMAX}$ represents a maximum allowable power, $M_{PUSCH}(i)$ is a bandwidth for PUSCH transmission, $\alpha(j)$ is a path loss compensation factor, $PL_C$ is a target path loss, $\Delta_{TF}(i)$ is a power offset based on modulation encoding mode and data type, and f(i) represents a closed-loop adjustment portion of power control, $n_{CQI}$ is a bit number of channel quality information, $n_{HARQ}$ is a bit number of a hybrid automatic repeat request, $n_{SR}$ is a bit number of a scheduling request, $h(n_{CQI}, n_{HARQ}, n_{SR})$ is a value based on a PUCCH format, F and F' are of PUCCH format, $\Delta_{F\_PUCCH}(F)$ is a value of PUCCH format F relative to PUCCH format 1a, $\Delta_{T \times D}(F')$ is a value associated with PUCCH transmission, g(i) is a state adjustment factor of PUCCH power control, and $M_{SRS}$ represents a bandwidth of the SRS.

11. A base station, comprising:
   a determination unit, configured to determine an adjustment value for an uplink sending power of a user equipment (UE); and
   a sending unit, configured to send to the UE indication information and the adjustment value for the uplink sending power of the UE determined by the determination unit, wherein the indication information is used for indicating a range of the adjustment value for the uplink sending power of the UE, so that the UE, according to the indication information and the adjustment value for the uplink sending power of the UE, determines the uplink sending power of the UE, wherein the adjustment value for the uplink sending power of the UE is identified by more than 4 bits, and a step of the adjustment value for the uplink sending power of the UE identified by the more than 4 bits is greater than or equal to 1 dB.

12. The base station according to claim 11, wherein:
   the sending unit is specifically configured to send the indication information to the UE through higher layer signaling; or
   the sending unit is specifically configured to send the indication information to the UE through a physical downlink control channel (PDCCH).

13. The base station according to claim 11, wherein the determination unit comprises at least one subunit of the following:
   a first determination subunit, configured to determine the adjustment value for the uplink sending power of the UE, for uplink power control of a physical uplink shared channel (PUSCH);
   a second determination subunit, configured to determine the adjustment value for the uplink sending power of the UE, for uplink power control of a physical uplink control channel (PUCCH); and
   a third determination subunit, configured to determine the adjustment value for the uplink sending power of the UE, for uplink power control of a sounding reference signal (SRS).

14. The base station according to claim 13, wherein the third determination subunit comprises at least one module of the following:
   a first determination module, configured to determine the adjustment value for the uplink sending power of the UE associated with the PUSCH, for uplink power control of the SRS; and
   a second determination module, configured to determine the adjustment value for the uplink sending power of the UE associated with the SRS, for uplink power control of the SRS.

15. A user equipment (UE), comprising:
   a receiving unit, configured to receive indication information and an adjustment value for an uplink sending power of the UE, sent by a base station, wherein the indication information is used for indicating a range of the adjustment value for the uplink sending power of the UE; and a processing unit, configured to determine, the uplink sending power of the UE according to the indication information and the adjustment value for the uplink sending power of the UE received by the receiving unit, wherein the adjustment value for the uplink sending power of the UE is identified by more than 4 bits, and a step of the adjustment value for the uplink sending power of the UE identified by the more than 4 bits is greater than or equal to 1 dB.

16. The UE according to claim 15, wherein:
the receiving unit is specifically configured to receive the indication information sent by the base station through higher layer signaling; or
the receiving unit is specifically configured to receive the indication information sent by the base station through a physical downlink control channel (PDCCH).

17. The UE according to claim 15, wherein the receiving unit comprises at least one subunit of the following:
a first receiving subunit, configured to receive the adjustment value for the uplink sending power of the UE, for uplink power control of a physical uplink shared channel (PUSCH), sent by the base station;
a second receiving subunit, configured to receive the adjustment value for the uplink sending power of the UE, for uplink power control of a physical uplink control channel (PUCCH), sent by the base station; and
a third receiving subunit, configured to receive the adjustment value for the uplink sending power of the UE, for uplink power control of a sounding reference signal (SRS), sent by the base station.

18. The UE according to claim 17, wherein the third receiving subunit comprises at least one module of the following:
a first receiving module, configured to receive the adjustment value for the uplink sending power of the UE associated with the PUSCH, for the uplink power control of the SRS, sent by the base station; and
a second receiving module, configured to receive the adjustment value for the uplink sending power of the UE associated with the SRS, for the uplink power control of the SRS, sent by the base station.

* * * * *

UNITED STATES PATENT AND TRADEMARK OFFICE
CERTIFICATE OF CORRECTION

PATENT NO. : 9,924,473 B2
APPLICATION NO. : 14/180556
DATED : March 20, 2018
INVENTOR(S) : Zhang et al.

Page 1 of 1

It is certified that error appears in the above-identified patent and that said Letters Patent is hereby corrected as shown below:

In the Claims

Column 13, Line 52, "$P_{O\_PUSCH}$" should read -- $P_{O\_PUSCH}^{(j)}$ --.

Signed and Sealed this
Thirty-first Day of July, 2018

Andrei Iancu
*Director of the United States Patent and Trademark Office*